United States Patent
Hijikata

(10) Patent No.: US 7,052,760 B2
(45) Date of Patent: May 30, 2006

(54) HONEYCOMB STRUCTURAL BODY AND ASSEMBLY THEREOF

(75) Inventor: Toshihiko Hijikata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 248 days.

(21) Appl. No.: 10/473,069

(22) PCT Filed: Mar. 20, 2002

(86) PCT No.: PCT/JP02/02644

§ 371 (c)(1),
(2), (4) Date: Sep. 26, 2003

(87) PCT Pub. No.: WO02/081057

PCT Pub. Date: Oct. 17, 2002

(65) Prior Publication Data

US 2004/0076794 A1    Apr. 22, 2004

(30) Foreign Application Priority Data

Mar. 30, 2001    (JP) ............................. 2001-102356

(51) Int. Cl.
*B32B 3/12*    (2006.01)
*B01D 53/34*    (2006.01)
*B01J 21/04*    (2006.01)

(52) U.S. Cl. ...................... 428/116; 422/177; 422/180; 502/439

(58) Field of Classification Search ................ 428/116; 422/177, 178, 179, 180, 181; 522/490, 493, 522/523; 502/439
See application file for complete search history.

(56) References Cited

U.S. PATENT DOCUMENTS

| 4,335,783 A | 6/1982 | McBrayer et al. ............. 165/8 |
| 4,810,554 A | 3/1989 | Hattori et al. ............... 428/116 |
| 5,782,089 A * | 7/1998 | Machida et al. ............... 60/299 |

(Continued)

FOREIGN PATENT DOCUMENTS

EP    0 361 883 A1    4/1990

(Continued)

OTHER PUBLICATIONS

Gulati, "Strength and Thermal Shock Resistance of Segmented Wall-Flow Diesel Filters," SAE Technical Paper Series, International Congress and Exposition, pp. 11-18, Feb. 24-28, 1986.

Primary Examiner—Rena Dye
Assistant Examiner—Timothy M. Speer
(74) Attorney, Agent, or Firm—Oliff & Berridge, PLC

(57) ABSTRACT

A honeycomb structural body (1) is obtained by bonding, into one piece, a plurality of honeycomb segments (2a, 2b) having a plurality of through-holes (6) surrounded by partition walls (10) and extending in the axial direction. An average wall thickness of at least one honeycomb segment (2a) not constituting the outermost peripheral surface (23) of the honeycomb structural body is larger than an average wall thickness of at least of each honeycomb segment (2b) constituting the outermost peripheral surface (23) of the honeycomb structural body. A honeycomb structural assembly is obtained by providing a material B having compressive elasticity on the outermost peripheral surface (23) of the honeycomb structural body (1) in a compressed state and thereby compression-holding the honeycomb structural body (1) in a metallic container. The honeycomb structural body and assembly have low reduction in the conversion rate, purification efficiency, regeneration efficiency, etc., during use, and are superior in durability against breakage caused by thermal stress.

15 Claims, 6 Drawing Sheets

U.S. PATENT DOCUMENTS 5,866,079 A * 2/1999 Machida et al. ............ 422/179
6,162,404 A   12/2000 Tojo et al. ................. 422/179

FOREIGN PATENT DOCUMENTS

| EP | 0 643 204 A2 | 3/1995 |
| EP | 0 854 123 A1 | 7/1998 |
| JP | A 54-110189 | 8/1979 |
| JP | A 54-150406 | 11/1979 |
| JP | A 55-147154 | 11/1980 |
| JP | A 58-19743 | 2/1983 |
| JP | U 61113915 | 7/1986 |
| JP | B2 61-51240 | 11/1986 |
| JP | A 5-168834 | 7/1993 |
| JP | A 8-28246 | 1/1996 |
| JP | A 2000-210517 | 8/2000 |
| JP | 2000-279728 | * 10/2000 |
| JP | A 2000-279728 | 10/2000 |
| JP | A 2000-279729 | 10/2000 |

* cited by examiner

HONEYCOMB STRUCTURAL BODY AND ASSEMBLY THEREOF

BACKGROUND

The present invention relates to a honeycomb structural body used in, for example, a catalyst carrier utilizing a catalytic action, for use in an internal combustion engine, a boiler, a chemical reactor, a fuel cell reformer, etc., and a filter for capturing fine particles present in an exhaust gas; as well as to an assembly thereof. More particularly, the present invention relates to a honeycomb structural body which has excellent durability against breakage caused by thermal stress appearing therein during its use, as well as to an assembly thereof.

Honeycomb structural bodies are in use in, for example, a carrier for a catalyst having a catalytic action, for use in an internal combustion engine, a boiler, chemical reactor, a fuel cell reformer, etc., and a filter for capturing fine particles present in an exhaust gas, particularly fine particles emitted from a diesel engine.

In the honeycomb structural body used for such a purpose, the sharp temperature change of exhaust gas or local heating makes non-uniform the temperature distribution inside the honeycomb structural body and there have been problems such as crack generation in the honeycomb structural body and the like. When the honeycomb structural body is used particularly as a filter for capturing a particulate substance in an exhaust gas emitted from a diesel engine, it is necessary to burn the fine carbon particles deposited on the filter to remove the particles and regenerate the filter and, in that case, high temperatures are inevitably generated locally in the filter; as a result, this process tends to generate large thermal stress and cracks.

Hence, there have been proposed processes for producing a honeycomb structural body by bonding a plurality of individual honeycomb segments using an adhesive. For example, U.S. Pat. No. 4,335,783 discloses a process for producing a honeycomb structural body, which comprises bonding a large number of honeycomb parts using a discontinuous adhesive. JP-B-61-51240 proposes a heat shock-resistant rotary regenerating heat exchanging method which comprises forming, by extrusion, matrix segments of honeycomb structural body made of a ceramic material, firing them, making smooth, by processing, the outer peripheral portions of the fired segments, coating the to-be-bonded areas of the resulting segments with a ceramic adhesive having, when fired, substantially the same mineral composition as the matrix segments and showing a difference in thermal expansion coefficient, of 0.1% or less at 800° C., and firing the coated segments. SAE article 860008 of 1986 discloses a ceramic honeycomb structural body obtained by bonding cordierite honeycomb segments with a cordierite cement. JP-A-8-28246 discloses a ceramic honeycomb structural body obtained by bonding honeycomb ceramic members with an elastic sealant made of at least a three-dimensionally intertwined inorganic fiber, an inorganic binder, an organic binder and inorganic particles.

Meanwhile, the regulation for exhaust gas has become stricter and engines have come to have higher performance. As a result, in order to achieve an improvement in combustion conditions of an engine and an increase in purification ability of a catalyst, the temperature of exhaust gas has increased year by year. In this connection, a higher thermal shock resistance has become required for honeycomb carriers. Therefore, even with honeycomb structural bodies such as mentioned above, when a sharp temperature change of inflow gas takes place, and a local heat of reaction, a local heat of combustion, etc., become larger during use, a thermal stress applied thereto may not be sufficiently relaxed, cracks may appear therein and, in an extreme case, there may occur, for example, disintegration of the honeycomb structural body and breakage of the structural body into fine pieces caused by vibration.

In order to solve these problems, there is a method of allowing a honeycomb structural body to have a large heat capacity, thereby making small the temperature change, and reducing the reaction rate and the combustion rate, lowering the maximum temperature, resulting in a relaxing of the thermal stress acting on the honeycomb structural body. Such a method, however, has had drawbacks of reductions in the reaction rate, purification efficiency and regeneration efficiency of a honeycomb structural body. In JP-B-54-110189 is proposed a honeycomb structural body in which the wall thickness of the honeycomb carrier is made smaller regularly in the cross-section toward the sectional center; and in JP-A-54-150406 and JP-A-55-147154 is proposed a honeycomb structural body in which the wall thickness of outer cells is made larger than the wall thickness of inner cells. These honeycomb structural bodies have large resistance to external mechanical stress; however, since the wall thickness of the inner cells is small, a large thermal stress is generated during use of the honeycomb structural body and its durability is not sufficient.

The present invention has been made in view of such past situations and aims at providing a honeycomb structural body which is low in reductions in the conversion rate, purification efficiency, regeneration efficiency, etc., during use and superior in durability against breakage caused by thermal stress.

SUMMARY

A study was made in order to achieve the above aim. As a result, it was found that by suppressing a temperature increase at the center of a honeycomb structural body and keeping high a temperature of its peripheral portion, reductions in the efficiencies (e.g. conversion rate) of a honeycomb structural body can be kept low and the durability of the honeycomb structural body against thermal stress can be improved. It was further found that by dividing a honeycomb structural body into at least an outer segment and an inner segment and making the average wall thickness of the outer segment smaller than the average wall thickness of the inner segment, the above aim can be achieved. The present invention has been completed based on these findings.

The first invention provides a honeycomb structural body obtained by bonding, into one piece, a plurality of honeycomb segments having a large number of through-holes surrounded by partition walls and extending in the axial direction of the segment, characterized in that an average wall thickness of at least one honeycomb segment not constituting the outermost peripheral surface of the honeycomb structural body is larger than an average wall thickness of at least one honeycomb segment constituting the outermost peripheral surface of the honeycomb structural body.

In the first invention, it is preferred that a ratio of the average wall thickness of the at least one honeycomb segment constituting the outermost peripheral surface to the average wall thickness of the at least one honeycomb segment not constituting the outermost peripheral surface is 0.2 to 0.9. It is also preferred that the sectional area of the at least one honeycomb segment not constituting the outermost peripheral surface is 9 to 81% of the sectional area of the honeycomb structural body. It is also preferred that the honeycomb structural body is used for purification of exhaust gas of an automobile, and it is further preferred that the honeycomb structural body is used as a filter for capturing diesel particulate. It is further preferred that a material A having compressive elasticity, more preferably a ceramic fiber-made mat, and more preferably a non-intumescent mat composed mainly of alumina or mullite, is provided at part or the whole of the spaces between side surfaces of each two adjacent honeycomb segments. It is further preferred that the main component of the honeycomb segment comprises (1) at least one kind of ceramic selected from the group consisting of silicon carbide, silicon nitride, cordierite, alumina, mullite, zirconia, zirconium phosphate, aluminum titanate, titania and combinations thereof, and (2) Fe—Cr—Al, nikel, or metallic Si and SiC.

The second invention of the present invention provides a honeycomb structural assembly comprising a metallic container, the honeycomb structural body mentioned above, a material B having compressive elasticity, wherein the material B having compressive elasticity is provided on the outermost peripheral surface of the honeycomb structural body in a compressed state and whereby the honeycomb structural body is compression-held in the metallic container.

In the second invention, the material B having compressive elasticity is preferably a ceramic fiber-made mat, and further is preferably a heat-intumescent mat containing vermiculite or a non-intumescent mat composed mainly of alumina or mullite. The honeycomb structural assembly is preferably a canned assembly obtained by a stuffing method, a tourniquet method, a clamshell method or a swaging method. Further, the honeycomb structural assembly is preferably obtained by loading a catalyst on honeycomb segments and then accommodating the catalyst-loaded honeycomb segments in a metallic container. The honeycomb structural assembly is preferably obtained also by accommodating honeycomb segments in a metallic container and then loading a catalyst on the honeycomb segments.

DETAILED DESCRIPTION OF THE PREFERRED EMBODIMENTS

The honeycomb structural body and honeycomb structural assembly of the present invention are described in detail below with reference to the accompanying drawings. However, the present invention is not restricted to the following mode. Incidentally, in the following, "section" refers to a section vertical to the direction of through-holes unless otherwise specified.

Figure 1A:
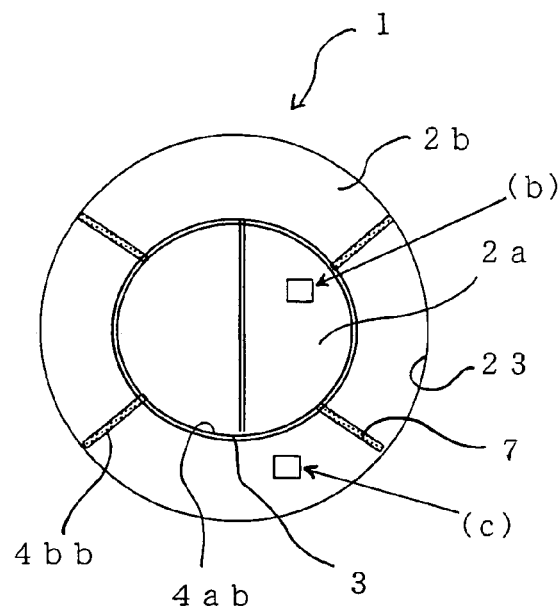
FIG. 1(a) is a schematic sectional view showing one embodiment of the honeycomb structural body of the present invention.

FIG. 1(a) is a schematic sectional view showing one embodiment of the honeycomb structural body of the present invention. The honeycomb structural body 1 of the present invention is formed by bonding into one piece honeycomb segments 2a and 2b each having a large number of through-holes 6 divided by partition walls 10 shown in FIGS. 1(b) and 1(c) and extending in the axial direction of the honeycomb segment.

Figure 1B:
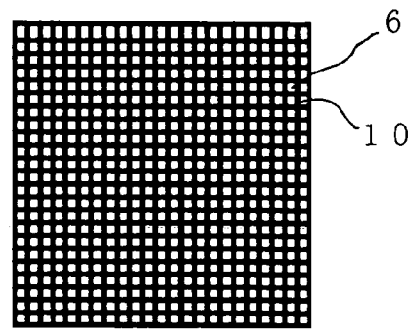
FIGS. 1(b) and 1(c) are respectively enlarged views of the inner segment and outer segment in FIG. 1(a).
Figure 1C:
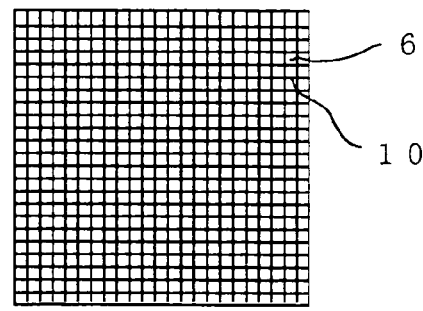

The important characteristic of the present invention is that, as shown in FIGS. 1(b) and 1(c), the average wall thickness [see FIG. 1(b)] of the honeycomb segment 2a not constituting the outermost peripheral surface 23 of the honeycomb structural body is larger than the average wall thickness [see FIG. 1(c)] of the honeycomb segments 2b constituting the outermost peripheral surface. In the present invention, the expression "average wall thickness" means the average thickness of walls 6 excluding the peripheral wall of honeycomb segment. In the honeycomb structural body of the present invention having such a constitution, the reaction rate at the center having a large wall thickness is suppressed low, and accordingly the maximum temperature inside the structural body decreases (becomes relatively lower) and the temperature at the outer portion (of small wall thickness) of the structural body increases (becomes relatively higher); as a result, the conversion rate, purification efficiency and regeneration efficiency can be kept at sufficient levels and the temperature distribution in the whole structural body can be made small. Therefore, the honeycomb structural body of the present invention can provide high efficiencies in conversion rate, purification efficiency, regeneration efficiency, etc., and shows an improved durability against breakage caused by thermal stress.

In the present invention, the expression "honeycomb segment not constituting the outermost peripheral surface of honeycomb structural body" (this segment is hereinafter called inner segment) means, in, for example, FIG. 1(a), two honeycomb segments 2a not constituting the outermost peripheral surface 23 of a honeycomb structural body 1; and the expression "honeycomb segment constituting the outermost peripheral surface of honeycomb structural body" (this segment is hereinafter called outer segment) means four honeycomb segments 2b constituting the outermost peripheral surface 23 of the honeycomb structural body 1. Accordingly, at least one inner segment means, in, for example, FIG. 1, one or two segments of the two inner segments 2a; and at least one outer segment means one, two, three or four segments of the four outer segments 2b. In the present invention shown in, for example, FIG. 1, the average thickness of the partition walls 10 in at least one segment of the four outer segments 2b is smaller than the average thickness of the partition walls 10 in at least one segment of the two inner segments 2a. In the present invention, it is preferred that the average wall thickness of the two inner segments 2a is larger than the average wall thickness of the four outer segments 2b.

Figure 2:
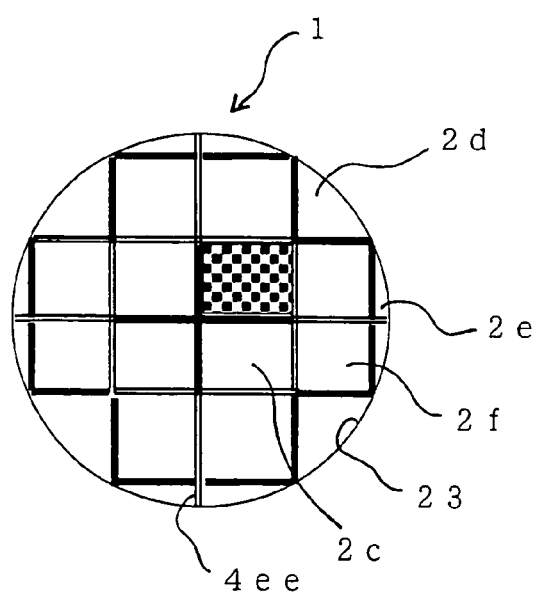
FIG. 2 is a schematic sectional view showing another embodiment of the honeycomb structural body of the present invention.

FIG. 2 shows another embodiment of the present invention. In this case, four central honeycomb segments 2c having a square section are inner segments; and eight honeycomb segments 2f, eight honeycomb segments 2e and four honeycomb segments 2d (total twenty honeycomb segments) are outer segments. Therefore, the average wall thickness of at least one segment of the inner segments 2c is made larger than the average wall thickness of at least one segment of the outer segments 2f, 2d and 2e.

The honeycomb segments 2c of larger average wall thickness is preferred to be located near the center of the honeycomb structural body 1. In, for example, FIG. 2, the average wall thickness of the four inner segments 2c contacting with the sectional center of the honeycomb structural body 1 is larger than the average wall thickness of one, more preferably all of the total twenty outer segments 2f, 2d and 2e.

The ratio of the average wall thickness of outer segments of small wall thickness to the average wall thickness of inner segments of large wall thickness is preferably 0.2 to 0.9, more preferably 0.3 to 0.9, and most preferably 0.5 to 0.8. When the ratio is too small, production of such a honeycomb structural body is substantially difficult; when the ratio is too close to 1, the intended effect of the present invention is unobtainable.

The sectional area of inner segment(s) of large wall thickness is preferably 9% or more, more preferably 16% or more, and further preferably 25% or more of the whole sectional area of the honeycomb structural body. In the present invention, the expression "sectional area" means the area (including through-holes) of a section perpendicular to the through-holes, such as shown in FIGS. 1(a), 1(b) and 1(c) or FIG. 2. When this sectional area is too small, the effect of the large wall thickness at inner segment(s) is insufficient. The sectional area of inner segment(s) of large wall thickness is preferably 81% or less, more preferably 64% or less, and further preferably 49% or less of the whole volume of the honeycomb structural body. When this sectional area is too large, reductions in reaction efficiency, etc., take place, which is not preferred.

In FIGS. 1(a), 1(b) and 1(c) and FIG. 2, the cell density (the number of through-holes per unit sectional area) is the same in the inner segments and the outer segments. However, in the present invention, the cell density may be different in the inner segments and the outer segments, and the cell density of the inner segment(s) of large wall thickness is preferred to be the same as or smaller than the cell density of the outer segment(s) of small wall thickness. In the present invention, the cell density of inner and outer segments is preferably 0.9 to 310 cells/cm$^2$ (6 to 2,000 cells/in.$^2$). When the cell density is less than 0.9 cell/cm$^2$, the geographical surface area is insufficient. When the cell density is more than 310 cells/cm$^2$, the pressure loss is too large. The sectional shape (cell shape) of the through-holes 6 of the honeycomb segment 2 is preferably any of a triangle, a tetragon and a hexagon from the standpoint of production of honeycomb segment.

The honeycomb structural body 1 of the present invention is obtained by bonding honeycomb segments 2 into one piece. It can be obtained, for example, by bonding side surfaces 4 of each two adjacent honeycomb segment using an adhesive 7. It is also preferred to provide a material A having compressive elasticity between side surfaces of each two adjacent honeycomb segments. It is also preferred to, as shown in FIGS. 1(a), 1(b) and 1(c), provide a material A 3 having compressive elasticity, more preferably a ceramic fiber-made mat, between the surfaces 4ab of inner segment 2a and outer segment 2b. It is also preferred to, as shown in FIG. 2, provide a material A3 having compressive elasticity between the side surfaces 4ee of two adjacent outer segments 2e. By thus providing a material A having compressive elasticity between side surfaces, the thermal stress of a honeycomb structural body is relaxed and the durability of the honeycomb structural body is further enhanced.

In the present invention, the material A having compressive elasticity is preferred to have heat resistance and cushioning. As the compressive elasticity material A having heat resistance and cushioning, there is a non-intumescent material containing substantially no vermiculite or a low-intumescent material containing a small amount of vermiculite. Such a material is preferred to contain, as a main component, a ceramic fiber made of at least one kind selected from the group consisting of alumina, high alumina, mullite, silicon carbide, silicon nitride, zirconia and titania, or of a composite thereof. Of these, a non-intumescent material containing substantially no vermiculite and composed mainly of alumina or mullite is more preferred. Further, the material A having compressive elasticity is preferred to be a mat made of such a fiber, and the ceramic fiber-made mat is preferred to be a non-intumescent mat composed mainly of alumina or mullite. Further preferably, these ceramic-made mats have a sealing property for prevention of the wetting of to-be-treated fluid. Preferred specific examples of the material A having compressive elasticity are 1100HT™ produced by 3M Co. and Maftec™ produced by Mitsubishi Chemical Corporation.

In the present invention, each honeycomb segment 2 is preferred to contain, as a main component, (1) at least one kind of ceramic selected from the group consisting of silicon carbide, silicon nitride, cordierite, alumina, mullite, zirconia, zirconium phosphate, aluminum titanate, titania and combinations thereof, and (2) Fe—Cr—Al, nickel, or metallic Si and SiC, from the standpoints of the strength, heat resistance, etc., of the honeycomb segment. In the present invention, "main component" means a substance which is 80% or more of all components and which becomes a main crystalline phase. The adhesive 7 can as well be selected from among the above-mentioned materials suitable for a honeycomb segment.

The section of the honeycomb segment 2 has preferably at least one side of 30 mm or more, more preferably 50 mm or more, and most preferably 70 mm or more, for easy arrangement of the material A having compressive elasticity in production of the honeycomb structural body.

Figure 3:
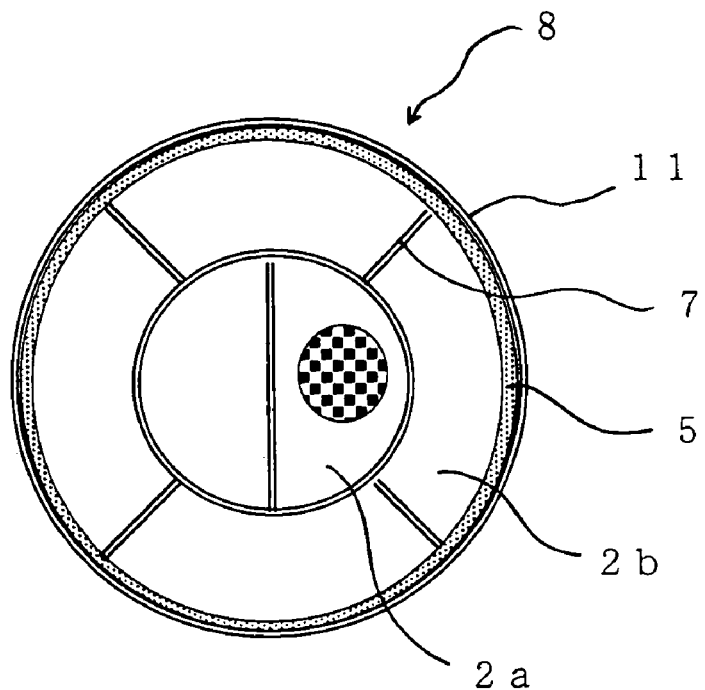
FIG. 3 is a schematic sectional view showing one embodiment of the honeycomb structural assembly of the present invention.

FIG. 3 is a schematic sectional view of a honeycomb structural assembly 8 obtained by holding a honeycomb structural body shown in FIG. 1(a), 1(b) and 1(c), in a metallic container 11. The honeycomb structural assembly 8 of the present invention, as shown in FIG. 3, is obtained by providing a material B having compressive elasticity, on the outermost peripheral surface 23 of a honeycomb structural body 1 in a compressed state and thereby compression-holding the honeycomb structural body 1 in a metallic container 11.

In the present invention, the material B having compressive elasticity is preferred to have heat resistance and cushioning, similarly to the above-mentioned material A having compressive elasticity, and is further preferred to have sealing property. The material B having compressive elasticity may be a non-intumescent material or an intumescent material. The material B having compressive elasticity is preferred to be, for example, a ceramic fiber composed mainly of at least one kind selected from the group consisting of alumina, high alumina, mullite, silicon carbide, silicon nitride, zirconia and titania, or of a composite thereof, and is further preferred to be a mat made of such a fiber. Specifically, there can be used, for example, 1100HT™ produced by 3M Co. and Maftec™ produced by Mitsubishi Chemical Corporation, both mentioned above. There can also be used, for example, Interlam Mat™ produced by 3M Co. (an intumescent mat).

Figure 4:
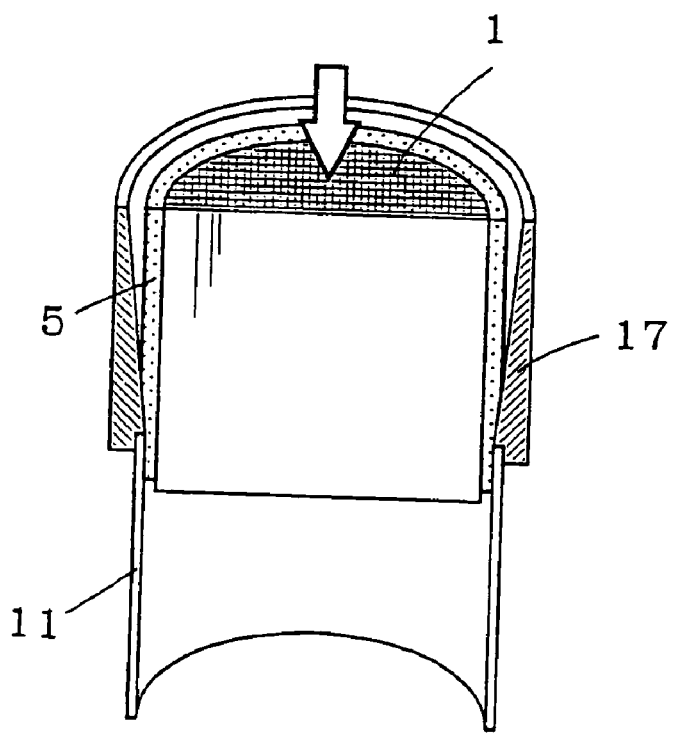
FIG. 4 is a partially cut-away view showing one example of the stuffing method used for accommodating a honeycomb structural body in a metallic container.
Figure 5:
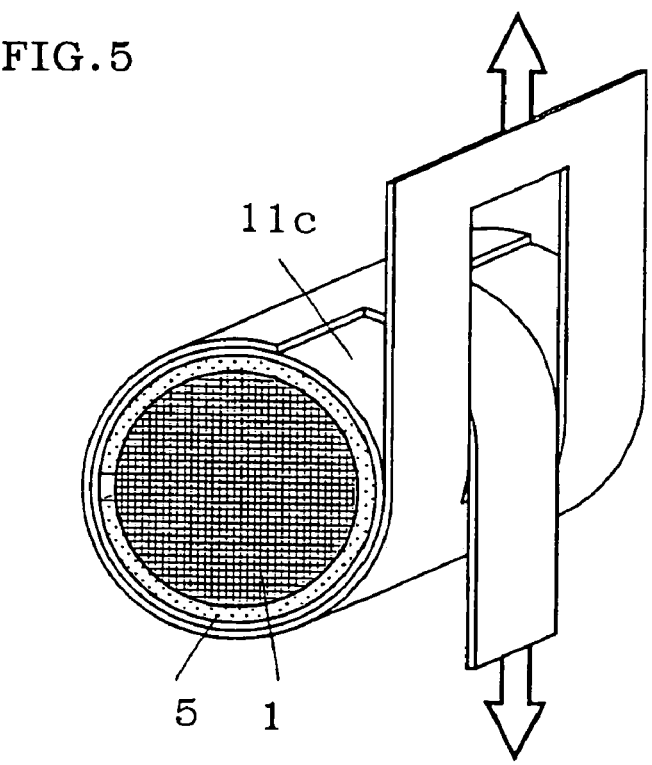
FIG. 5 is a perspective view showing one example of the tourniquet method used for accommodating a honeycomb structural body in a metallic container.
Figure 6:
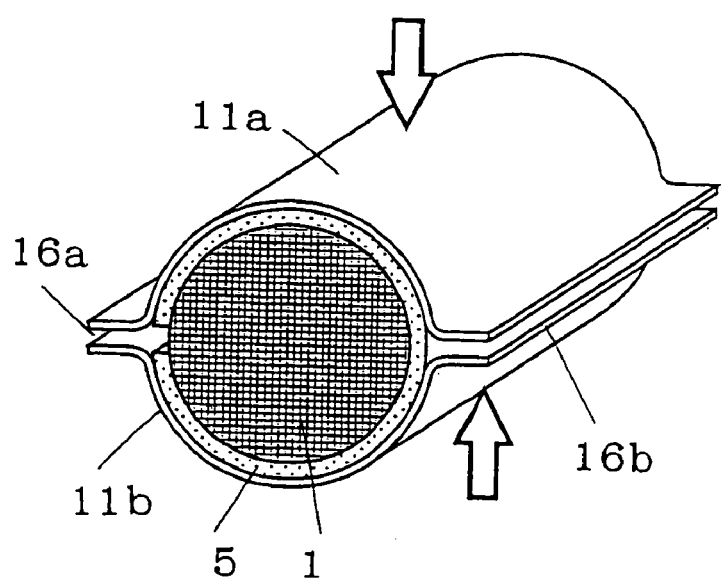
FIG. 6 is a perspective view showing one example of the clamshell method used for accommodating a honeycomb structural body in a metallic container.
Figure 7:
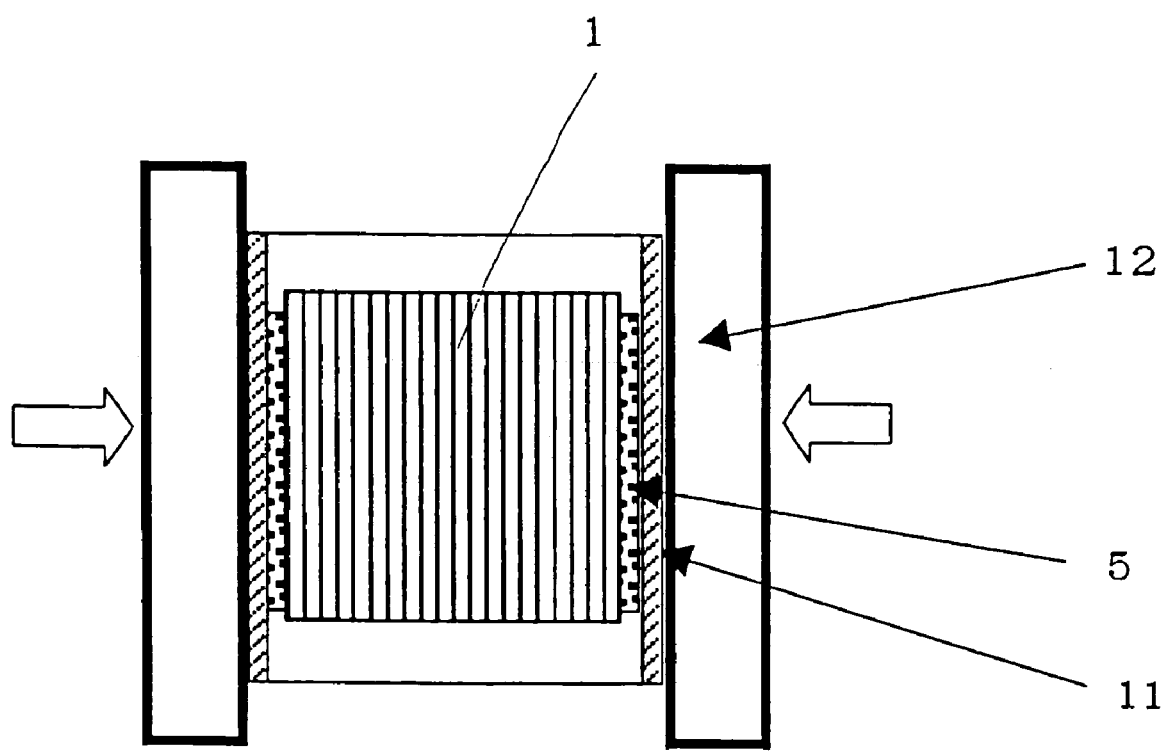
FIG. 7 is a sectional view parallel to the direction of through-holes, showing one example of the swaging method used for accommodating a honeycomb structural body in a metallic container.
Figure 8:
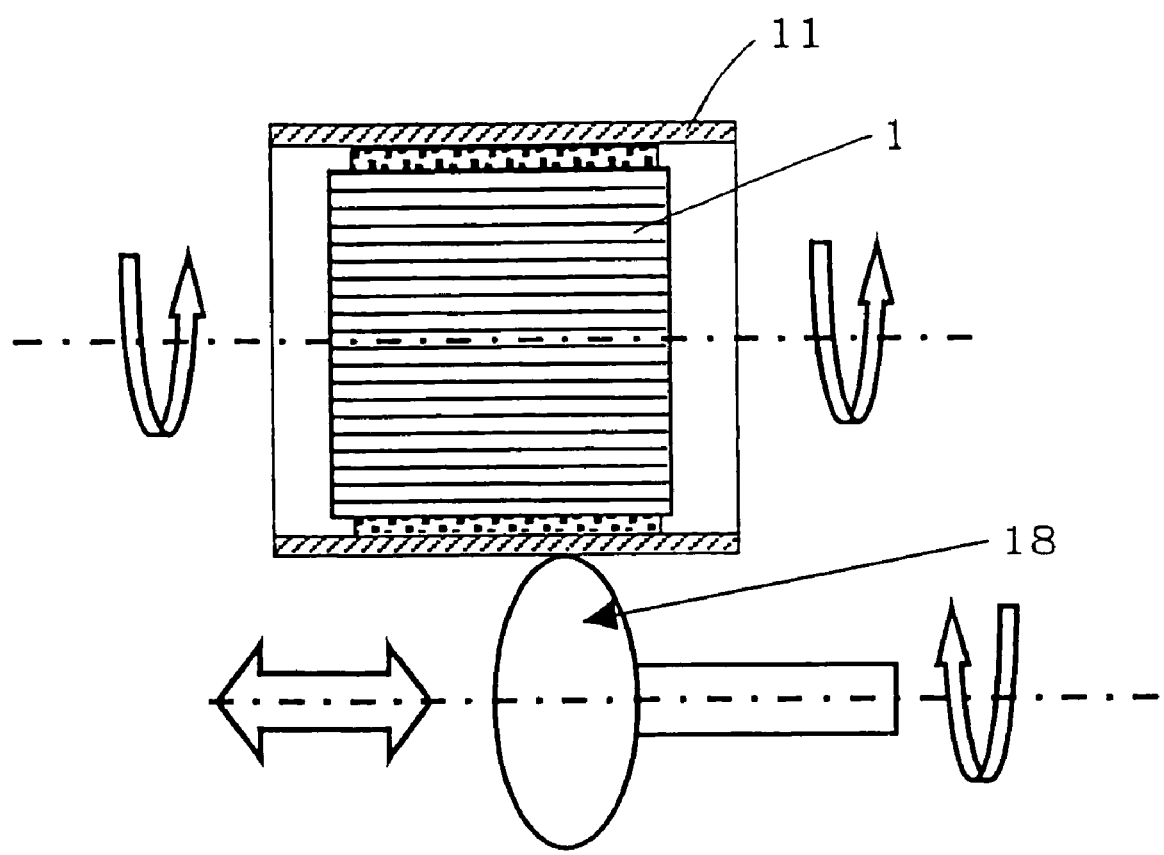
FIG. 8 is a sectional view parallel to the direction of through-holes, showing one example of the swaging method used for accommodating a honeycomb structural body in a metallic container.

In the present invention, as the method for accommodating a honeycomb structural body 1 and a material B having compressive elasticity in a metallic container 11 in a compressed state, there are suitably used a stuffing method shown in FIG. 4, using a guide 17; a tourniquet method shown in FIG. 5, which comprises winding a metallic plate 11c round a honeycomb structural body, pulling the plate to impart a pressure to the outer surface of the honeycomb structural body, and welding and fixing the to-be-jointed areas of the metallic plate 11c; and a clamshell method shown in FIG. 6, which comprises interposing a honeycomb structural body between two metallic container parts 11a and 11b with a load being applied to the parts 11a and 11b, and welding the to-be-bonded areas (flanges) 16a and 16b of the parts 11a and 11b to obtain a honeycomb structural body/metallic container integrated material. There is also suitably used a method (a swaging method) utilizing metal plastic processing, shown in FIG. 7, which comprises applying a compression force to a metallic container 11 from the outside via a tap (of pressure type) to squeeze the outer diameter of the metallic container 11. There can also be used a method shown in FIG. 8, which comprises squeezing, by plastic processing, the outer surface of a metallic container 11 using a processing jig 18 with the metallic container 11 being rotated, that is, a method which comprises squeezing the outer diameter of a metallic container by rotary forging and thereby imparting a pressure to the outer surface of a honeycomb structural body accommodated in the metallic container.

When the honeycomb structural body or honeycomb structural assembly of the present invention is used as a carrier for catalyst in an internal combustion engine, a boiler, a chemical reactor, a fuel cell reformer, or the like, the honeycomb segments used therein are allowed to load thereon a metal having a catalytic activity. As representative metals having a catalytic activity, there are mentioned Pt, Pd, Rh, etc. It is preferred that at least one kind selected from these metals is loaded on the honeycomb segments.

Meanwhile, when the honeycomb structural body or honeycomb structural assembly of the present invention is used as a filter for capturing and removing the particulate substance contained in an exhaust gas, for example, as a diesel particulate filter (DPF), it is preferred that the cells of the honeycomb structural body are plugged alternately at each end face of structural body and the partition walls of the honeycomb structural body are used as a filter.

When an exhaust gas containing a particulate substance is taken into a honeycomb structural body constituted by honeycomb segments, from its one end face, the exhaust gas enters the inside of the honeycomb structural body from those holes not plugged at the one end face, passes through porous partition walls having a filtration ability, and is discharged from those holes not plugged at the other end face. The particulate substance is captured by the partition walls at the time of its passing through the partition walls.

The material used for plugging an end face of honeycomb segment can be selected from the above-mentioned materials suitable for the honeycomb segment 2.

As the amount of particulate substance captured and deposited on partition walls increases, a sudden increase in pressure loss takes place, a load on the engine increases, and a reduction in fuel consumption and drivability occurs; hence, the deposited particulate substance is burnt and removed periodically by a heating means such as heater or the like, to regenerate the ability of the filter. In order to promote combustion during regeneration, it is possible to load, on the honeycomb structural body, the above-mentioned metal having a catalyst activity.

In the present invention, in order to load a catalyst on a honeycomb structural assembly, there can be used a method which comprises holding a honeycomb structural body 1 in a metallic container 11, to form a honeycomb structural assembly 8 prior to catalyst loading, and then loading a catalyst on the honeycomb structural body 1. According to this method, the risk of chipping-off or breakage of honeycomb structural body 1 during catalyst loading can be prevented. It is also preferred that when the honeycomb structural body or honeycomb structural assembly of the present invention is used as a catalytic converter, a catalyst component is loaded on a honeycomb segment 2, then a honeycomb structural body 1 is formed, and the structural body is accommodated and held in a metallic container 11.

The present invention is described in more detail below by way of Examples. However, the present invention is not restricted to these Examples.

Incidentally, each of the following honeycomb structural bodies produced in Examples and Comparative Examples is a filter used for capturing diesel particulate, wherein the through-holes are plugged alternately at each end face of the honeycomb structural body and the partition walls function as a filter.

EXAMPLE 1

A silicon carbide powder was used as a raw material. Thereto were added methyl cellulose, hydroxypropoxyl methyl cellulose, a surfactant and water to prepare a plastic material. This material was subjected to extrusion molding, and the resulting extrudate was dried using a microwave and hot air. Then, the holes of the dried extrudate were plugged alternately at each end face of the extrudate with a sealant made of the same material as for the honeycomb structural body to be obtained, in such a way that each end face of the extrudate looked a checkerboard pattern. Then, the resulting material was heated for debindering in a $N_2$ atmosphere and then fired in an Ar atmosphere, to obtain the outer segment 2b having a sectional shape of ¼ of a ring having a outer diameter of 144 mm and an inner diameter of 73 mm and a length of 152 mm, and the inner segment 2a having a sectional shape of ½ of a circle having a diameter of 72 mm and a length of 152 mm. These honeycomb segments were bonded using an adhesive which was a mixture of colloidal silica, an alumina fiber and water, and dried, whereby was assembled a cylindrical honeycomb structural body 1 having a diameter of 144 mm and a length of 152 mm. In the honeycomb structural body 1, each inner segment 2a had a wall thickness of 0.43 mm, a cell density of 31 cells/cm$^2$ and a unit heat capacity of 0.76 J/cm$^{3.\circ}$ C.; each outer segment 2b had a wall thickness of 0.38 mm, a cell density of 31 cells/cm$^2$ and a unit heat capacity of 0.68 J/cm$^{3.\circ}$ C.; the heat capacity ratio of inner and outer segments was 0.89; and the wall thickness ratio was 0.88. Further, the ceramic fiber-made non-intumescent mat was wound around the outermost peripheral surface of the honeycomb structural body 1, then the resulting material was stuffed in a SUS 409-made metallic container 11 using a tapered jig, to compression-fix the segments to each other and compression-fix the honeycomb structural body to the metallic container, to obtain a honeycomb structural assembly 8.

EXAMPLE 2

The same operation as in Example 1 was conducted to obtain the honeycomb structural body 1 wherein each inner segment 2a had a wall thickness of 0.53 mm, a cell density of 16 cells/cm$^2$ and a unit heat capacity of 0.67 J/cm$^3\cdot{}^\circ$C.; each outer segment 2b had a wall thickness of 0.38 mm, a cell density of 31 cells/cm$^2$ and a unit heat capacity of 0.68 J/cm$^3\cdot{}^\circ$C.; the heat capacity ratio of inner and outer segments was about 1; and the wall thickness ratio was 0.72. Further, the ceramic fiber-made non-intumescent mat was wound e around the outermost peripheral surface of the honeycomb structural body 1, then the resulting material was stuffed in a SUS 409-made metallic container 11 using a tapered jig, to compression-fix the segments to each other and compression-fix the honeycomb structural body to the metallic container, to obtain a honeycomb structural assembly 8.

EXAMPLE 3

The same operation as in Example 1 was conducted to obtain a honeycomb structural body 1 wherein each inner segment 2a had a wall thickness of 0.64 mm, a cell density of 16 cells/cm$^2$ and a unit heat capacity of 0.78 J/cm$^3\cdot{}^\circ$C.; each outer segment 2b had a wall thickness of 0.31 mm, a cell density of 31 cells/cm$^2$ and a unit heat capacity of 0.56 J/cm$^3\cdot{}^\circ$C.; the heat capacity ratio of inner and outer segments was 0.72; and the wall thickness ratio was 0.48. Further, the ceramic fiber-made non-intumescent mat was wound around the outermost peripheral surface of the honeycomb structural body 1, then the resulting material was stuffed in a SUS 409-made metallic container 11 using a tapered jig, to compression-fix the segments to each other and compression-fix the honeycomb structural body to the metallic container, to obtain a honeycomb structural assembly 8.

COMPARATIVE EXAMPLE 1

The same operation as in Example 1 was conducted to obtain a honeycomb structural body 1 wherein each of the inner segments and outer segments had a wall thickness of 0.38 mm, a cell density of 31 cells/cm$^2$ and a unit heat capacity of 0.68 J/cm$^3\cdot{}^\circ$C.; and the heat capacity ratio of inner and outer segments and the wall thickness ratio were each 1. Further, the ceramic fiber-made non-intumescent mat was wound around the outermost peripheral surface of the honeycomb structural body 1, then the resulting material was stuffed in a SUS 409-made metallic container using a tapered jig, to compression-fix the segments to each other and compression-fix the honeycomb structural body to the metallic container 11, to obtain a honeycomb structural assembly 8.

COMPARATIVE EXAMPLE 2

The same operation as in Example 1 was conducted to obtain a honeycomb structural body 1 wherein each of the inner segments and outer segments had a wall thickness of 0.43 mm, a cell density of 31 cells/cm$^2$ and a unit heat capacity of 0.76 J/cm$^3\cdot{}^\circ$C.; and the heat capacity ratio of inner and outer segments and the wall thickness ratio were each 1. Further, the ceramic fiber-made non-intumescent mat was wound around the outermost e peripheral surface of the honeycomb structural body 1, then the resulting material was stuffed in a SUS 409-made metallic container 11 using a tapered jig, to compression-fix the segments to each other and compression-fix the honeycomb structural body to the metallic container 11, to obtain a honeycomb structural assembly 8.

COMPARATIVE EXAMPLE 3

The same operation as in Example 1 was conducted to obtain a honeycomb structural body 1 wherein each inner segment 2a had a wall thickness of 0.38 mm, a cell density of 47 cells/cm$^2$ and a unit heat capacity of 0.81 J/cm$^3\cdot{}^\circ$C.; each outer segment 2b had a wall thickness of 0.38 mm, a cell density of 31 cells/cm$^2$ and a unit heat capacity of 0.68 J/cm$^3\cdot{}^\circ$C.; the heat capacity ratio of inner and outer segments was 0.84; and the wall thickness ratio was 1. Further, the ceramic fiber-made non-intumescent mat was wound around the outermost peripheral surface of the honeycomb structural body 1, then the resulting material was stuffed in a SUS 409-made metallic container 11 using a tapered jig, to compression-fix the segments to each other and compression-fix the honeycomb structural body to the metallic container, to obtain a honeycomb structural assembly 8.

(Burning and Regeneration Test)

Each of the thus-obtained honeycomb filters (honeycomb structural assemblies) of Examples 1 to 3 and Comparative Examples 1 to 3 was allowed to capture 30 g of fine particles emitted from a diesel engine (hereinafter called as soot). The soot deposited on each filter was burnt using an exhaust gas having an inlet gas temperature of 700° C., an oxygen content of 10% and a flow rate of 0.7 Nm$^3$/min, and temperature measurement was made at 15 points inside the honeycomb structural body. After the burning test, the weight of each honeycomb filter was measured to determine its soot regeneration efficiency. Further, the damage of the structural body caused by firing and regeneration was observed visually and using a stereoscopic microscope to examine the presence or absence of breakage.

Figure 9:
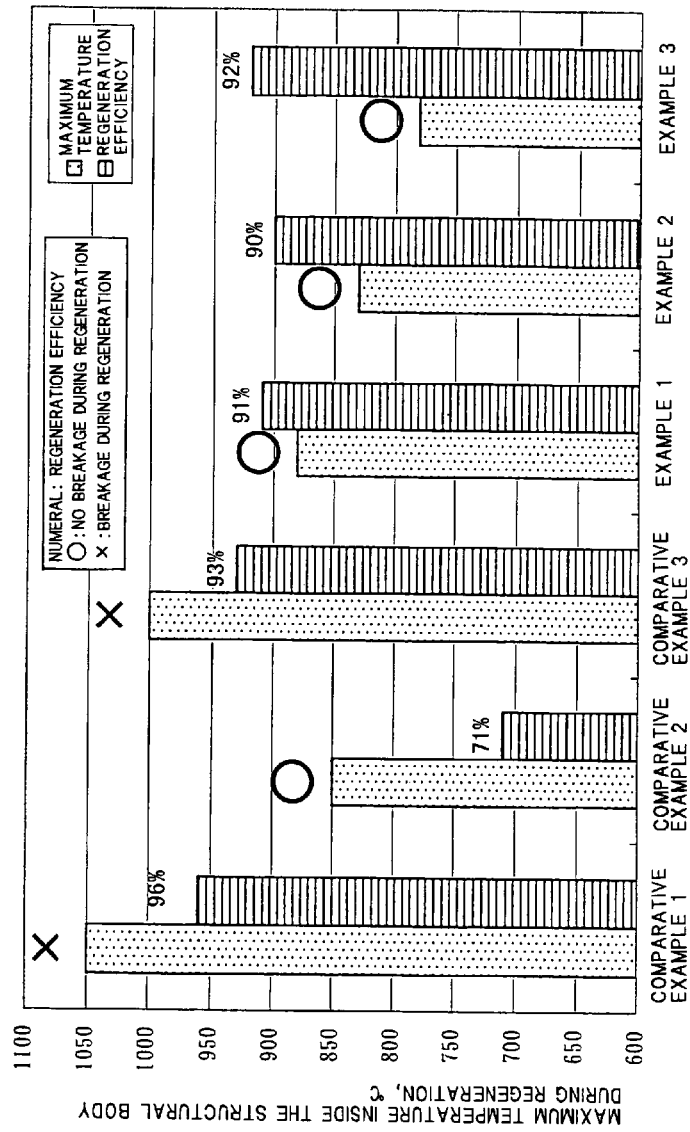
FIG. 9 is a graph showing the result of a burning and regeneration test.

The properties of the filters produced in Examples 1 to 3 and Comparative Examples 1 to 3 are summarized in Table 1 and the test results are shown in FIG. 9. In the honeycomb structural body of Comparative Example 1, the inside maximum temperature increased to 1,050° C. and breakage occurred. In Comparative Example 2 where the wall thickness was made larger, the maximum temperature inside the honeycomb structural body during regeneration decreased to 850° C. and no damage such as cracks was seen in the honeycomb structural body; however, the temperature at the outer peripheral portion did not increase and the soot regeneration efficiency was extremely low at 71%. In Comparative Example 3, although the heat capacity of the inner segments was made larger, the maximum temperature inside the honeycomb structural body was high at 1,000° C. and the honeycomb structural body broke. In contrast, in Examples 1 to 3 according to the present invention, the maximum temperature was suppressed low at 780 to 880° C. and the soot regeneration efficiency was high at 90 to 92%.

TABLE 1

|  |  | Comparative Examples | | | Examples | | |
| --- | --- | --- | --- | --- | --- | --- | --- |
|  |  | 1 | 2 | 3 | 1 | 2 | 3 |
| Cell structure | Inner segments | 0.38/31 | 0.43/31 | 0.38/47 | 0.43/31 | 0.53/16 | 0.64/16 |
|  | Outer segments | 0.38/31 | 0.43/31 | 0.38/31 | 0.38/31 | 0.38/31 | 0.31/31 |
| Heat capacity ratio (outer segments/inner segments) | | 1 | 1 | 0.84 | 0.89 | 1 | 0.72 |
| Wall thickness ratio (outer segments/inner segments) | | 1 | 1 | 1 | 0.88 | 0.72 | 0.48 |

Cell structure: wall thickness (mm)/cells (per cm$^2$)

INDUSTRIAL APPLICABILITY

As described above, in the honeycomb structural body and assembly thereof, of the present invention, the wall thickness of the inner portion was made larger than that of the outer portion and thereby the maximum temperature generated in the structural body was suppressed low and, moreover, the wall thickness of the outer portion was made smaller than that of the inner portion and thereby the temperature of the outer peripheral portion increased; as a result, the soot regeneration efficiency was high and accordingly the durability and the efficiency were high.

The invention claimed is:

1. A honeycomb structural body obtained by bonding, into one piece, a plurality of honeycomb segments each having a plurality of through-holes surrounded by partition walls and extending in the axial direction of the segment, wherein an average partition wall thickness of at least one honeycomb segment not constituting the outermost peripheral surface of the honeycomb structural body is larger than an average Partition wall thickness of each honeycomb segment constituting the outermost peripheral surface of the honeycomb structural body.

2. The honeycomb structural body according to claim 1, wherein a ratio of the average partition wall thickness of the honeycomb segments constituting the outermost peripheral surface to the average partition wall thickness of the at least one honeycomb segment not constituting the outermost peripheral surface is 0.2 to 0.9.

3. The honeycomb structural body according to claim 1, wherein a sectional area of the at least one honeycomb segment not constituting the outermost peripheral surface is 9 to 81% of a sectional area of the honeycomb structural body.

4. The honeycomb structural body according to claim 1, wherein the honeycomb structural body is an exhaust gas purification filter of an automobile.

5. The honeycomb structural body according to claim 1, wherein the honeycomb structural body is a filter that captures diesel particulate.

6. The honeycomb structural body according to claim 1, wherein a material A having compressive elasticity is provided at part or the whole of the spaces between side surfaces of each two adjacent honeycomb segments.

7. The honeycomb structural body according to claim 6, wherein the material A having compressive elasticity is a ceramic fiber-made mat.

8. The honeycomb structural body according to claim 7, wherein the ceramic fiber-made mat is a non-intumescent mat composed mainly of alumina or mullite.

9. The honeycomb structural body according to claim 1, wherein the main component of the honeycomb segment comprises (1) at least one kind of ceramic selected from the group consisting of silicon carbide, silicon nitride, cordierite, alumina, mullite, zirconia, zirconium phosphate, aluminum titanate, titania and combinations thereof, and (2) Fe—Cr—Al nickel, or metallic Si and SiC.

10. A honeycomb structural assembly comprising:
a metallic container,
a honeycomb structural body, obtained by bonding, into one piece, a plurality of honeycomb segments having a plurality of through-holes surrounded by partition walls and extending in the axial direction of the segment, wherein an average partition wall thickness of at least one honeycomb segment not constituting the outermost peripheral surface of the honeycomb structural body is larger than an average partition wall thickness of each honeycomb segment constituting the outermost peripheral surface of the honeycomb structural body, and
a material B having compressive elasticity,
wherein the material B having compressive elasticity is provided on the outermost peripheral surface of the honeycomb structural body in a compressed state and thereby the honeycomb structural body is compression-held in the metallic container.

11. The honeycomb structural assembly according to claim 10, wherein the material having compressive elasticity is a ceramic fiber-made mat.

12. The honeycomb structural assembly according to claim 11, wherein the ceramic fiber-made mat is a heat-intumescent mat containing vermiculite or the non-intumescent mat.

13. The honeycomb structural assembly according to claim 10, wherein the honeycomb structural assembly is a canned assembly obtained by a stuffing method, a tourniquet method, a clamshell method or a swaging method.

14. The honeycomb structural assembly according to claim 10, wherein the honeycomb structural assembly is obtained by loading a catalyst on honeycomb segments and then accommodating the catalyst-loaded honeycomb segments in a metallic container.

15. The honeycomb structural assembly according to claim 10, wherein the honeycomb structural assembly is obtained by accommodating honeycomb segments in a metallic container and then loading a catalyst on the honeycomb segments.

* * * * *